Aug. 21, 1962 W. G. WHITNEY ETAL 3,050,596

TRANSVERSAL RECORDING MACHINE

Filed Oct. 28, 1959 3 Sheets-Sheet 1

INVENTORS
WILLIAM G. WHITNEY
BOSCO WU
BY
George H. Fritzinger
AGENT

INVENTORS
WILLIAM G. WHITNEY
BOSCO WU
BY
George H. Fritzinger
AGENT

INVENTORS
WILLIAM G. WHITNEY
BOSCO WU
BY
George H. Fritzinger
AGENT 3,050,596
Patented Aug. 21, 1962

3,050,596

TRANSVERSAL RECORDING MACHINE

William G. Whitney, Wayne, and Bosco Wu, Livingston, N.J., assignors to McGraw-Edison Company, Elgin, Ill., a corporation of Delaware Filed Oct. 28, 1959, Ser. No. 849,336
9 Claims. (Cl. 179—100.2)

This invention relates particularly to long-playing magnetic-tape phonographs of the type using a rotating turntable carrying a plurality of magnetic heads in successive tracks across a wide magnetic tape which is moved longitudinally in synchronism with the rotation of the turntable.

A general object of the invention is to provide an improved phonograph of the character described having an improved signal to noise ratio.

Recording and reproducing machines of the type mentioned require lead-out connections from the revolving magnetic heads to the stationary audio components which have been made through slip-rings. However, a difficulty in slip-ring connections is that during reproducing when the heads are connected in the low-level input circuit of the amplifier the resistance noise of the sliding connections is of a magnitude comparable to the signal level from the reproducer head with the result that the signal to noise ratio is very low. An object of the invention is to mount the amplifier or at least the initial voltage stage thereof on the rotating turntable with the magnetic heads so that no sliding connections are needed in the amplifier input circuit during reproducing.

A further object is to connect the magnetic heads successively to the revolving amplifier through respective microswitches which are operated successively by rotation of the turntable.

A further object is to mount also the record-reproduce interchange switch on the turntable with the amplifier and to provide a control means along the shaft of the turntable for operating the interchange switch from a stationary point during rotation of the turntable.

A further object is to eliminate switching noise in the input of the amplifier by connecting the individual switches in parallel, short-circuiting relationship with the respective heads, and by opening the switches successively by rotation of the turntable to bring the respective successive heads effectively in circuit with the amplifier.

These and other objects and features of the invention will be apparent from the following description and the appended claims.

In the description of the invention reference is had to the accompanying drawings, of which:

Figure 1:
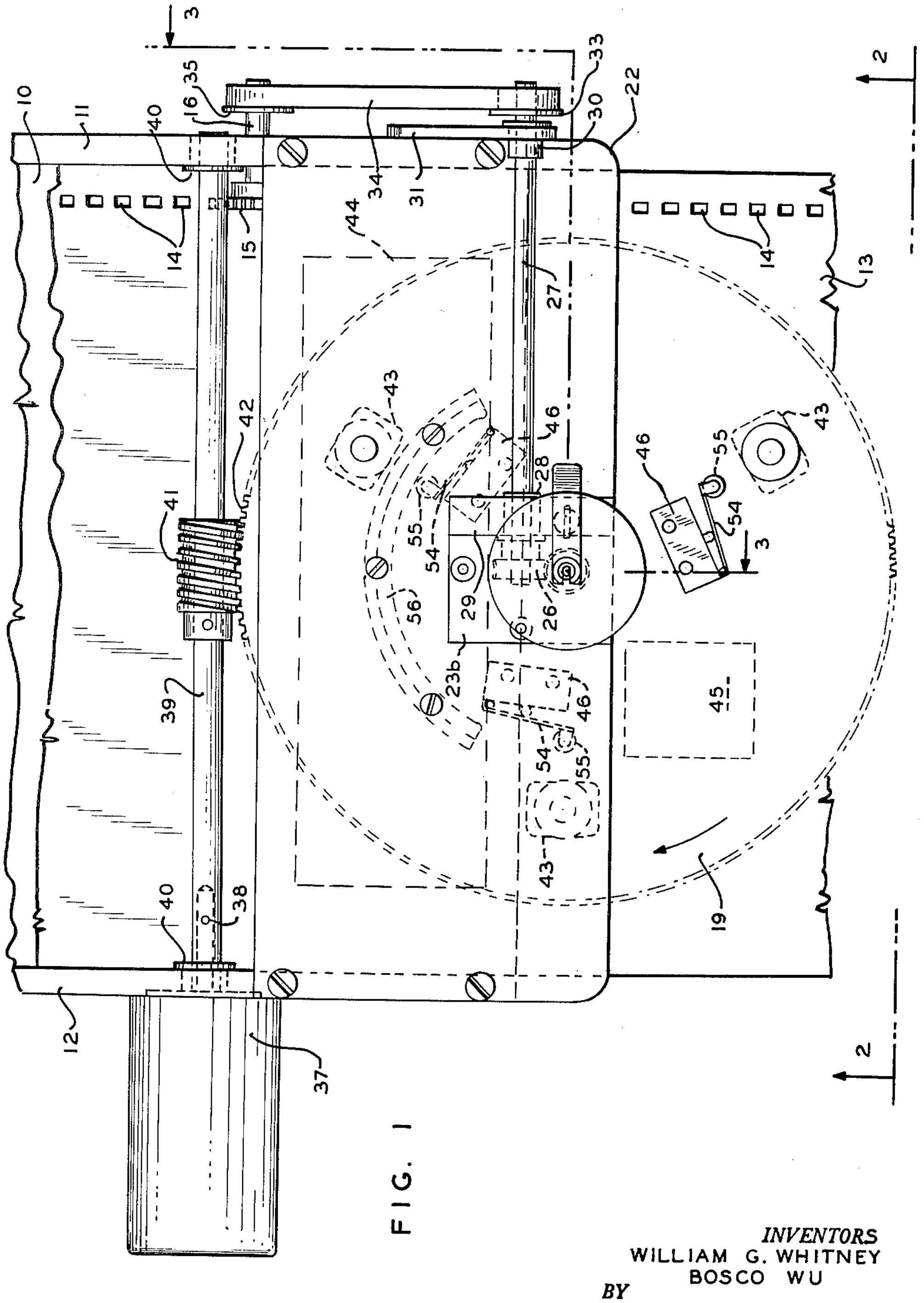
FIGURE 1 is a plan view of a long-playing magnetic-tape phonograph according to the invention.

The present machine comprises a base plate 10 having left and right side standards 11 and 12 forming a channel therebetween for a wide magnetic tape 13 to be driven longitudinally thereof. The tape has sprocket holes 14 along one edge engaged by a sprocket wheel 15 on a shaft 16 journaled in the standard 11. Guide strips 17 and 18 are mounted on the base plate and are inset in the side standards for slidably embracing the border portions of the tape and guiding the same longitudinally as the sprocket wheel is turned. Overlying the tape is a turntable 19 parallel thereto, which has a hollow upright shaft 20 journaled at its lower end in a bearing 21 carried by a horizontal frame plate 22 bridging the side standards 11 and 12. Secured to the upper side of this frame plate by screws 23*a* is a bracket 23 having a horizontal leg 23*b* spaced from and parallel to the frame plate. Mounted in this leg 23*b* of the bracket is a second bearing for the shaft 20. The shaft extends through the bearing 24 and has a worm 25 mounted on the upper end portion thereof. The shaft is confined vertically by a thrust bearing at the upper end formed by abutment of the worm against the upper bearing 24 and by a hub 20*a* on the shaft at its lower end in abutting relationship with the lower bearing 21.

Engaging the worm 25 is a worm wheel 26 secured to a transverse shaft 27. This shaft is journaled in a bearing 28 near the worm wheel 26 mounted in a standard 29 upstanding from the top horizontal leg of the bracket 23. At its other end the shaft 27 is supported in a bearing 30 carried by a vertical frame plate 31 secured by screws 32 to the outer side wall of the standard 11. Beyond the bearing 30 the shaft 27 has a pulley 33 connected thereto which is coupled by a belt 34 to a pulley 35 connected to the shaft 16 of the sprocket wheel 15. The belt 34 is held in a tautened condition by an adjustable idler pulley 36 mounted on the frame plate 31. Thus, as the turntable is rotated the sprocket wheel is turned slowly by the coupling through the shaft 20, worm gear 25—26, shaft 27, belt 34 and shaft 16 to cause the tape 13 to be propelled longitudinally thereof in a forward direction as it appears in FIGURE 1.

The turntable is rotated by a motor 37 mounted on the right standard 12 and having a short shaft telescoping with and pinned at 38 to a long cross shaft 39 spanning the width of the machine. The shaft 39 is journaled in bearings 40 in the standards 11 and 12. At its central portion the shaft 39 has a worm 41 secured thereto which meshes with the worm teeth 42 on the periphery of the turntable. Mounted on the underside of the turntable at equal angular intervals about the axis thereof are a plurality of magnetic heads 43 of which three are shown by way of example. During rotation of the turntable the heads are swept successively across the tape 13 to define a continuous succession of recording tracks across a central band of the tape forming its recording area, this central band of the tape being determined by a resilient pad 44 on the base 10 (FIGURE 2) elevating this portion of the tape for sliding contact with the revolving heads. Typically, the turntable is rotated at such speed as will move the heads at a linear speed of the order of 2 inches per second, and the tape is advanced at approximately .090 inch per revolution of the turntable to provide successive parallel tracks at approximately .030 inch intervals.

The machine as so far described is of a standard construction and forms a part of the present invention only insofar as it is combined with the apparatus herein next described.

Figure 2:
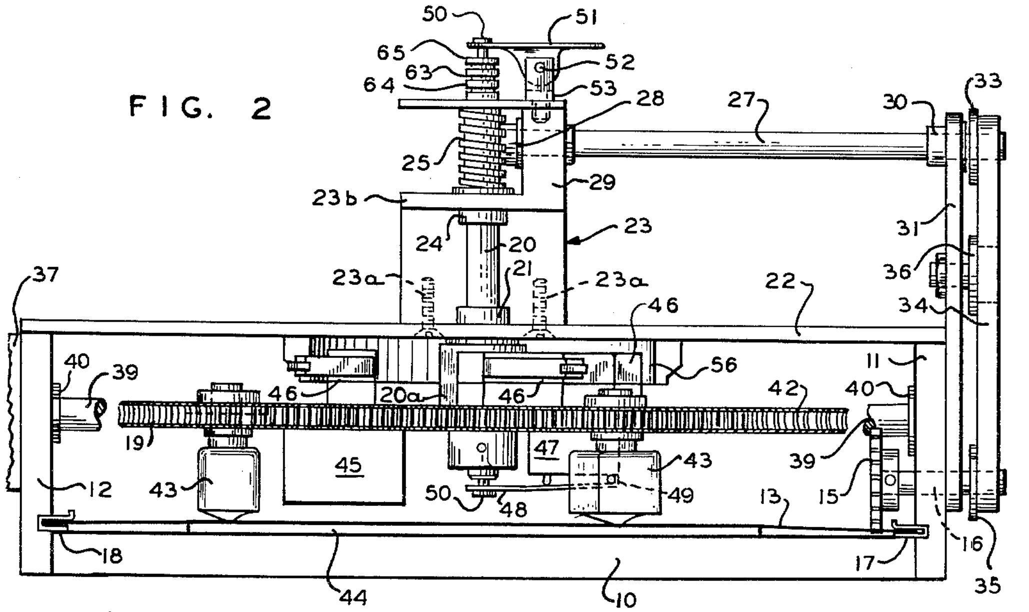
FIGURE 2 is a fractional front elevational view of the machine taken from the line 2—2 of FIGURE 1.
Figure 3:
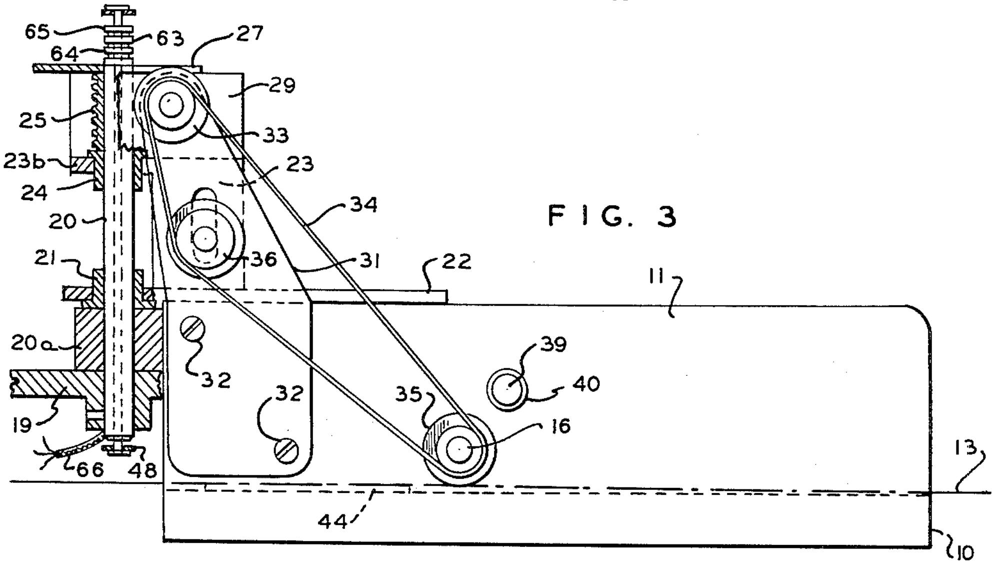
FIGURE 3 is a righthand elevational view with parts in section taken on line 3—3 of FIGURE 1.
Figure 4:
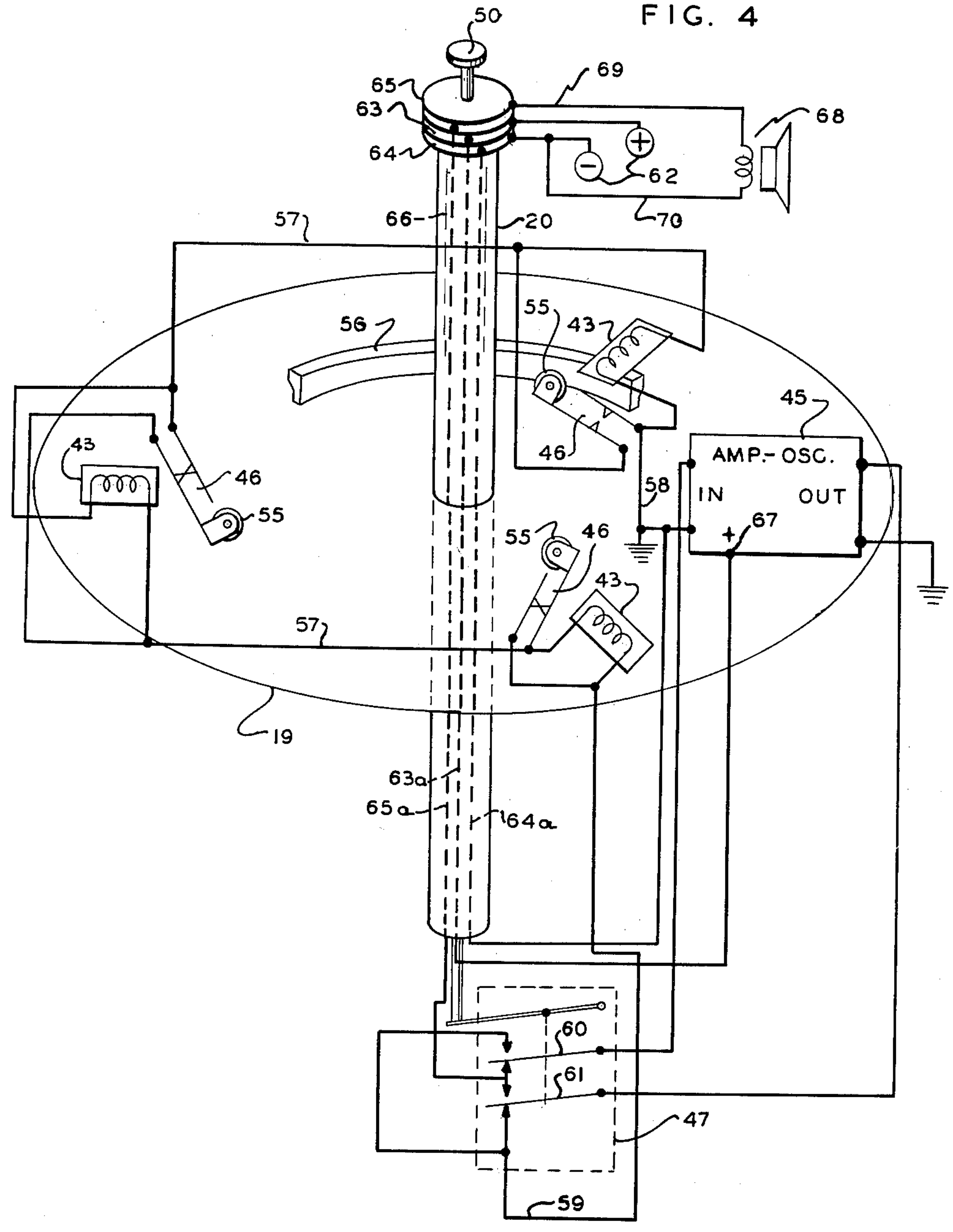
FIGURE 4 is a circuit diagram of the electrical audio and control system showing the turntable and the components carried therewith in perspective.

In order to provide the present machine with an improved signal to noise ratio the machine is provided with a record-reproduce amplifier 45 mounted on the turntable to eliminate the need for slip-ring connections in the low-level audio circuits of the machine during reproducing, and microswitches 46 are provided on the turntable for successively switching the heads into the audio circuit. Preferably, the microswitches are connected in parallel with the respective heads and are opened successively by rotation of the turntable to bring the heads successively into the audio circuit without any serial switch connections which could introduce noise through faulty contacts. In FIGURE 4—which shows a single line circuit of the audio and control system with the other line being grounded for simplification of description—the amplifier 45 is considered as including also an oscillator to supply the necessary bias voltage for magnetic recording. This amplifier-oscillator is preferably of a transistor type in order to reduce size and weight. On the turntable with the amplifier are the respective microswitches 46 and a record-reproduce interchange switch 47. As shown in FIGURE 2 the interchange switch is of a button type operable by a lever 48 hinged at 49 to the switch housing. The lever 48 extends crosswise to the axis of the turntable whereat it is coupled to a plunger 50 that extends axially through the shaft 20 to the top thereof. The upper end of the plunger is coupled to a manual rocker 51 pivoted at 52 to a short upstanding stud 53 on the standard 29. The interchange switch is biased into record position shown in FIGURE 4 and is operable upwardly into reproduce position by pressing downwardly on the manual rocker 51.

The microswitches 46 are of the normally closed button type each provided with a hinged operating lever 54 (FIGURE 1) which when pressed radially inwardly of the turntable operates the switch into open position. The switches are mounted on the upper side of the turntable at equal angular intervals as shown in FIGURE 1. On the outer ends of the operating levers of the switches are respective rollers 55 for riding successively onto the inner side of a stationary arcuate rail 56 of approximately 120 degrees length mounted on the underside of the frame plate 22. This rail shifts the switches in succession into their open positions during successive ⅓ portions of each revolution of the turntable. As shown in FIGURE 4, the three magnetic heads are connected serially in a common circuit 57 starting with the grounded lead 58 and ending with lead wire 59 connected to the two outermost contacts of the double-pole, double-throw interchange switch. Also, each head is connected in parallel with the respective one of the microswitches 46. Thus, two of the heads are at all times disabled by being shorted while the third head is effectively connected in the common circuit 57 by its respective switch 46 being held open by the rail 56 as the head is swept across the active portion of the tape. Alternatively, the rail may have a slightly greater length than 120 degrees so as to render two heads operative simultaneously during each instant that one is riding off of one side of the active band of the tape and the other is riding onto the active portion. Pole members 60 and 61 of the interchange switch 47 are connected respectively to the input and output terminals of the amplifier. In the record position shown in FIGURE 4, the pole 61 makes with the common head circuit 57 to connect this circuit to the amplifier output. Alternatively, when the switch 47 is shifted upwardly into its reproduce position, the pole 60 makes with the common head circuit to connect the same to the amplifier input.

Electrical power to the amplifier is supplied from a source designated by the plus and minus terminals 62 in FIGURE 4. These terminals are connected respectively to slip-rings 63 and 64 insulatedly mounted on the upper portion of the turntable shaft 20. These slip-rings, together with a third slip-ring 65 also insulatedly mounted on the shaft 20, are connected by respective leads 63*a*, 64*a* and 65*a* of a three-wire cable 66 running through the shaft 20 to electrical components on the turntable as follows: lead 63*a* to a power supply terminal 67 on the amplifier, lead 64*a* to the grounded lead wire 58, and lead 65*a* to the two central contacts of the interchange switch. Exteriorly of the machine is a combined microphone-receiver type of transducer 68 connected at one side by a lead wire 69 to the slip-ring 65 and at the other side by a lead wire 70 to the negative side of the source 62. Thus, when the interchange switch 47 is in record position the transducer 68 operating as a microphone is connected by the slip-rings 64 and 65, leads 64*a* and 65*a*, and pole 60 to the input of the amplifier. When the interchange switch 47 is thrown to its reproduce position the transducer 68 operating as a speaker is connected by the slip-rings and lead wires just mentioned, and the pole 61 of the interchange switch to the output of the amplifier.

From the foregoing description it is apparent that during reproducing the common head circuit 57 is connected through the pole 60 of the interchange switch to the input of the amplifier without running through any serial switch connections of a sliding type. Moreover, these solid line connections are maintained even as the turntable is rotated because the microswitches 46 are normally closed and connected in parallel with the respective heads, and the heads are brought into the audio circuit by the opening of these switches. These improved operating conditions provide for a complete elimination of all resistance and switch contact noises in the low-level audio circuits of the machine, and as a result an improved signal to noise ratio is obtained.

The embodiment of our invention herein particularly shown and described is intended to be illustrative and not limitative of the invention since the same is subject to changes and modifications without departure from the scope of our invention, which we endeavor to express according to the following claims:

We claim:

1. In a transversal type magnetic tape recording and/or reproducing machine including drive means for longitudinally advancing the tape through the machine; the combination of a rotatably mounted turntable having one face thereof confronting one side of the tape, a plurality of magnetic heads on said turntable circumferentially spaced around the axis of the turntable for movement transversely across said tape in succession as the turntable is rotated, a common circuit for said magnetic heads, a switch on said turntable for each of said heads each operable to connect the respective head effectively into said common circuit, said switches being equal angularly spaced about said axis and each having an operating member projecting therefrom, and a stationary arcuate cam member positioned in the path of travel of said switch operating members for causing said switches to be operated successively as the turntable is rotated, said cam member being relatively positioned about said axis and having a predetermined circumferential length adapted to cause each magnetic head to be connected to said common circuit only during its movement across a predetermined active portion of the tape.

2. The combination set forth in claim 1 wherein said turntable is positioned above said tape with said heads mounted fixedly on the bottom side thereof and with said switches mounted within the circular path of travel of the heads, including a stationary frame member and means mounting said arcuate cam member on said frame member.

3. The combination set forth in claim 2 including an electrical amplifier mounted on said turntable, a record-reproduce interchange switch mounted also on said turntable for connecting said common circuit selectively to either the input or output of said amplifier, and shiftable means at the axis of the turntable for operating said interchange switch from a stationary point while the turntable is rotating.

4. In a wide tape recording and/or reproducing machine including drive means for longitudinally advancing the tape through the machine; the combination of a rotatable turntable having a plurality of record cooperable heads mounted thereon for movement successively across the tape as the turntable is rotated, an electronic amplifier mounted on said turntable, and switching means on said turntable operated in synchronism with the rotation thereof for successively connecting said heads to said amplifier.

5. The combination set forth in claim 4 wherein said switching means includes an individual switch for each head, said switches being mounted at equal arcuate distances about the axis of the turntable and having respective operating members, and a stationary arcuate cam member in the path of travel of said operating members and of a predetermined length adapted to maintain connection between each head and said amplifier for the duration of one traversal of the head across the tape for each revolution of the turntable.

6. The combination set forth in claim 4 wherein said heads are connected serially in a common circuit, and said switching means comprises individual switches paralleling said heads respectively and means for operating the switches successively into open positions as said turntable is rotated.

7. The combination set forth in claim 4 including a microphone and receiver transducer means, record-reproduce interchange switch means mounted on said turntable for interchanging the connections of said heads and said transducer means between the input and output of said amplifier, and slip-ring connections between said interchange switch means and said transducer means.

8. The combination set forth in claim 7 including means coupled to said interchange switch means and extending along the axis of said turntable for shifting the interchange switch means while the turntable is rotating.

9. In a long-playing magnetic-tape recording and reproducing machine including drive means for longitudinally advancing a wide magnetic tape through the machine; the combination of a turntable having a plurality of magnetic heads mounted thereon at equal angular distances about the axis of the turntable for engaging the tape and moving there across in succession as the turntable is rotated, record-reproduce transistor amplifier mounted on said turntable, a common circuit and respective switches on said turntable for said plurality of heads, said switches being mounted at equal angular distances about the axis of the turntable and operable for effectively connecting the heads respectively to said common circuit, cam means for operating the head switches sequentially responsive to the rotation of the turntable for causing each head to be connected to said common circuit for the duration of one transversal of the head across the tape for each revolution of the turntable, a receiver-microphone transducer means, a record-reproduce interchange switch on said turntable for connecting the said common circuit to the input of said amplifier and the output of the amplifier to said transducer means in the reproduce position of the interchange switch and for connecting said transducer means to the input of the amplifier and said common head circuit to the output of the amplifier when the interchange switch is in record position, said connecting means including slip-ring connections between said interchange switch and said transducer means, a slip-ring connection for supplying power to said amplifier, and operating means extending along the shaft of said turntable for controlling said interchange switch during rotation of the turntable.

References Cited in the file of this patent

UNITED STATES PATENTS

| | | |
|---|---|---|
| 2,245,286 | Marzocchi | June 10, 1941 |
| 2,553,629 | Behr | May 22, 1951 |
| 2,554,835 | Mallina | May 29, 1951 |
| 2,679,551 | Newby | May 25, 1954 |
| 2,750,449 | Thompson et al. | June 12, 1956 |
| 2,924,668 | Yasushi Hoshino et al. | Feb. 9, 1960 |